United States Patent [19]
Anderson

[11] Patent Number: 5,927,343
[45] Date of Patent: Jul. 27, 1999

[54] HOSE FENDER DEVICE

[76] Inventor: John V. Anderson, 3620 Terry Lake Rd., Fort Collins, Colo. 80524

[21] Appl. No.: 08/943,480

[22] Filed: Oct. 3, 1997

Related U.S. Application Data

[60] Provisional application No. 60/028,535, Oct. 15, 1996, and provisional application No. 60/035,248, Jan. 9, 1997.

[51] Int. Cl.$^6$ ..................................................... F16L 57/00
[52] U.S. Cl. ......................... 138/110; 138/106; 138/109; 138/96 R
[58] Field of Search ..................................... 138/110, 106, 138/109, 96 R, 96 T

[56] References Cited

U.S. PATENT DOCUMENTS

| | | | |
|---|---|---|---|
| 805,579 | 11/1905 | Patchen | 138/110 |
| 1,044,013 | 11/1912 | Burnett | 138/110 |
| 1,693,459 | 11/1928 | Paulus et al. | 138/110 |
| 2,172,130 | 9/1939 | Powell | 138/110 |
| 4,228,823 | 10/1980 | Zepeda | 138/110 |
| 4,712,755 | 12/1987 | Robbins et al. | 138/106 |
| 4,796,378 | 1/1989 | Krueger et al. | |
| 4,895,280 | 1/1990 | Tourigny | 138/110 |
| 5,474,123 | 12/1995 | Buckshaw | 138/110 |

*Primary Examiner*—Denise L. Ferensic
*Assistant Examiner*—James F. Hook
*Attorney, Agent, or Firm*—John K. Flanagan; John R. Flanagan; Flanagan & Flanagan

[57] ABSTRACT

A hose fender device includes a clamp mechanism and a deflector member. The clamp mechanism is adapted to be received over an end portion of a hose adjacent to a connector provided on the hose for attaching an appliance thereto. The deflector member includes a pair of opposite arms. Each of the arms has first and second ends. The first ends are attached to respective opposite sides of the clamp mechanism. The opposite arms extend from their first ends in a flared divergent relationship to one another to the second ends thereof being free ends. In such manner, the opposite arms together define a substantially triangular-shaped protected area therebetween and extending rearwardly of the connector of the hose. The clamp mechanism is adjustably movable between an open position and a selected one of a plurality of closed clamping positions which adapts the device for securement to hoses of different diameter sizes.

20 Claims, 2 Drawing Sheets

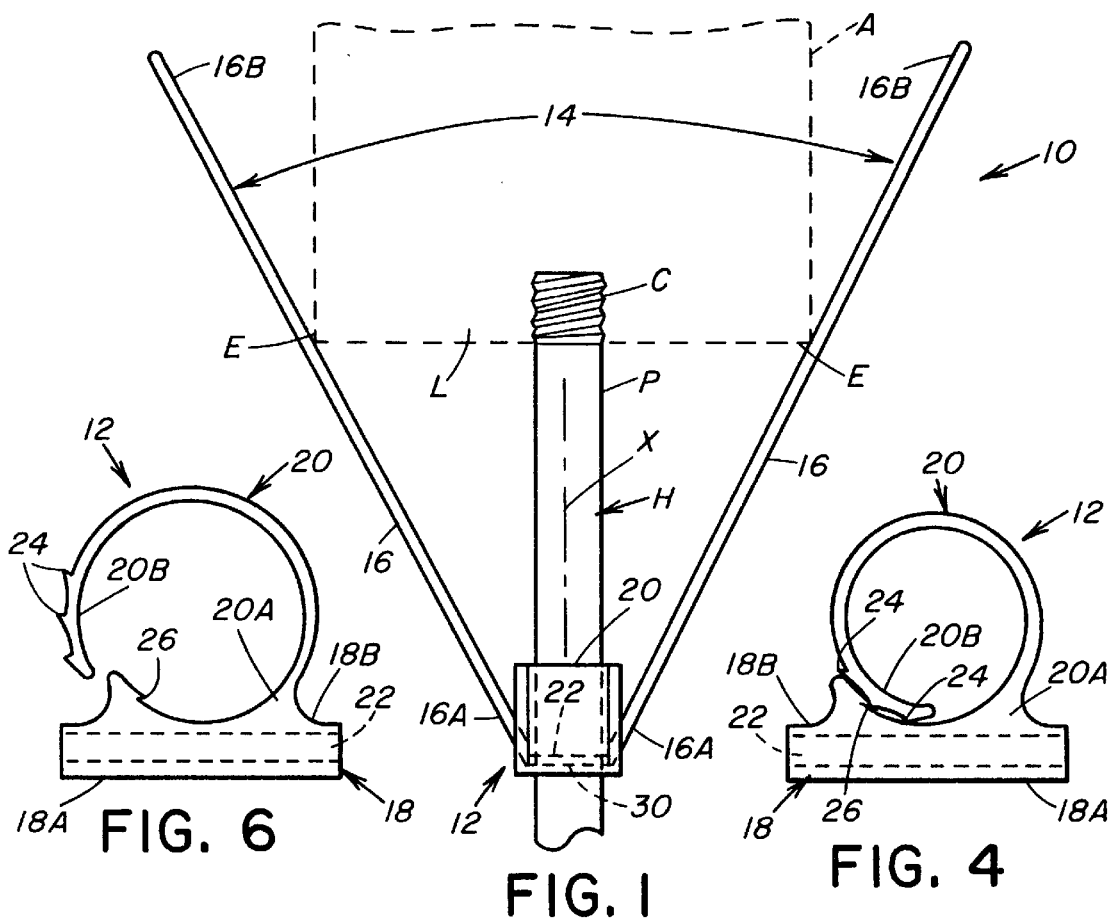
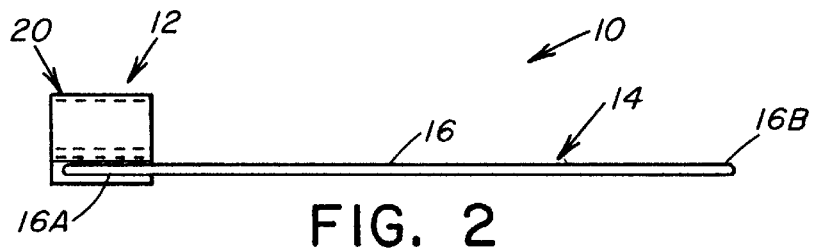
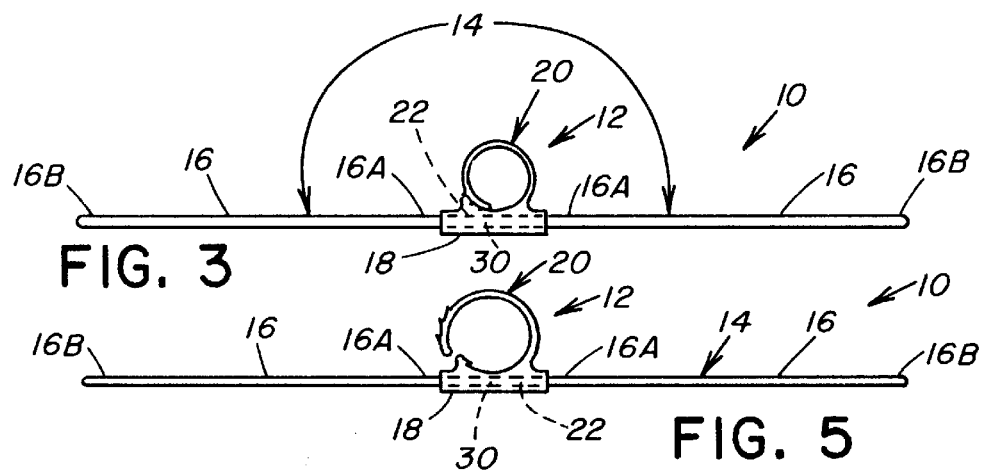

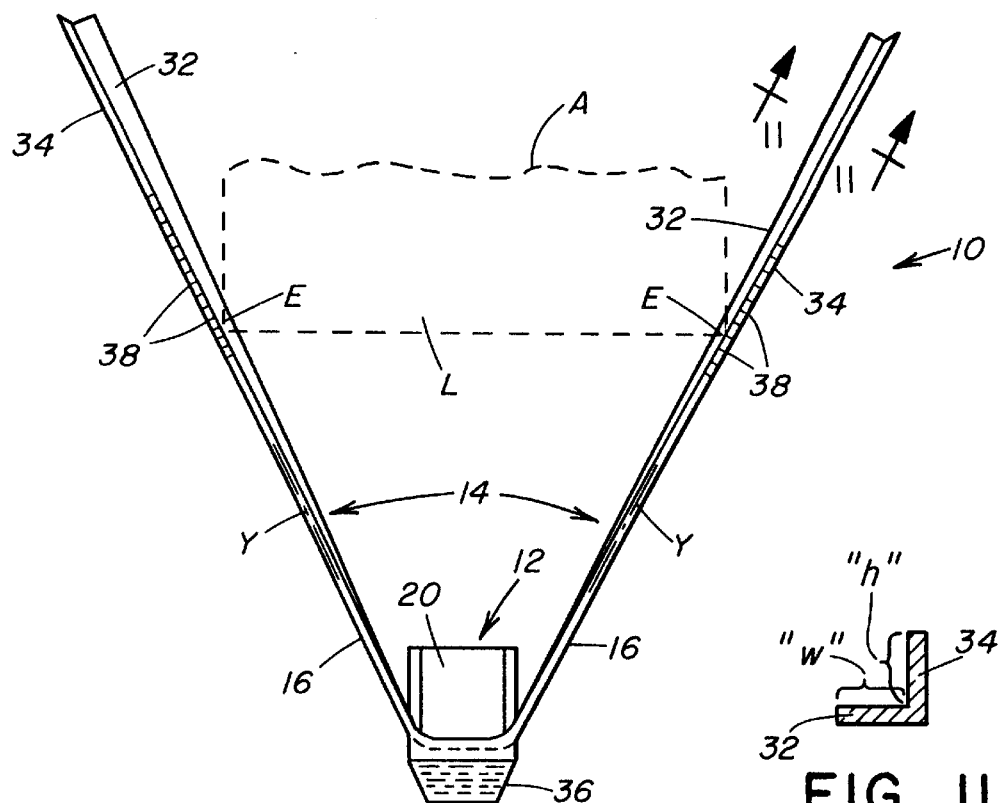
FIG. 7
FIG. 11
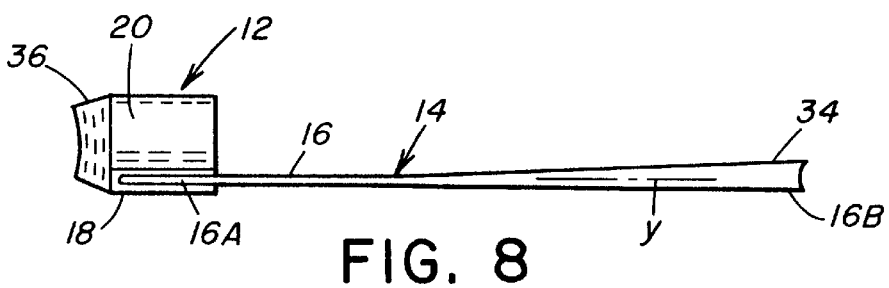
FIG. 8
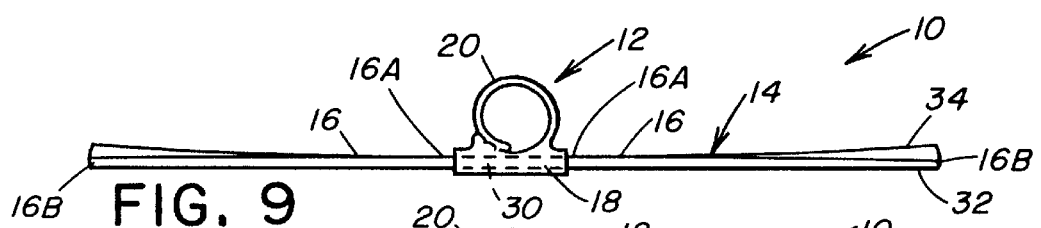
FIG. 9
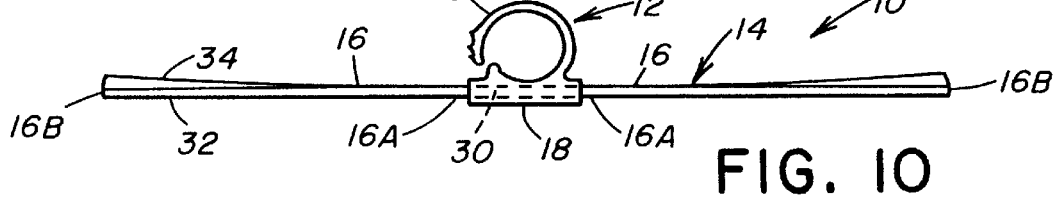
FIG. 10

HOSE FENDER DEVICE

This application claims the benefit of U.S. provisional application No. 60/028,535, filed Oct. 15, 1996, and U.S. provisional application No. 60/035,248, filed Jan. 9, 1997.

BACKGROUND OF THE INVENTION

1. Field of the Invention

The present invention generally relates to hose attachments and, more particularly, is concerned with a hose fender device and shielded hose assembly.

2. Description of the Prior Art

Gardeners and others who use hoses frequently drag hoses with appliances connected thereto across lawns and around corners of buildings in order to place the hoses in desired locations. These appliances typically have portions which extend outwardly at various angles from the hoses and may constitute hook-like appendages which can snag and get caught on something. Hoses with such appendages are often inadvertently brought into contact with objects such as buildings, lawn furniture, vehicles or bushes.

This is a frustrating problem for gardeners and/or homeowners alike, requiring them to spend extra time and energy to disengage the appliances from these objects. An effective solution to this problem does not appear to exist in the prior art.

Consequently, a need remains for a device which provides a solution to the aforementioned problem in the prior art without introducing any new problems in place thereof.

SUMMARY OF THE INVENTION

The present invention provides a hose fender device designed to satisfy the aforementioned need. The hose fender device of the present invention is constructed and shaped so as to couple with a variety of hoses, such as those used in yards, gardens and the like. The hose fender device shields the leading portion of an appliance facing in the direction of movement of the hose. The hose fender device prevents catching of a portion or appendage of the appliance on an object while the hose and appliance are pulled past the object.

Accordingly, the present invention is directed to a hose fender device which comprises: (a) a clamp mechanism adapted to be received on and secured to an end portion of a hose adjacent to a connector provided on the hose for attaching an appliance thereto; and (b) a deflector member having a pair of opposite elongated arms, each of the opposite arms having first and second ends, the first ends being secured to the clamp mechanism and extending from opposite sides of the clamp mechanism in a flared divergent relationship to one another to the second ends being free ends such that the opposite arms define a substantially triangular-shaped protected area therebetween extending rearwardly of the connector of the hose for receiving at least a leading portion the appliance in the protected area.

The clamp mechanism preferably is adjustable between an open position and a selected one of a plurality of closed clamping positions which adapts the device for securement to hoses of different diameter sizes. The flared relationship of the opposite arms ensures that they will be first to come in sliding contact with a nearby object and not be snagged by the object and thus protect the appliance so that it will clear and not be snagged by the object.

Also, a leading end of the clamp mechanism forms a tapered annular-shaped edge which provides a flared transitional surface from the hose to the opposite arms defined by the deflector member when the clamp mechanism is in the closed position. Having a substantially conical shape, the edge is less likely to catch on nearby objects when the hose fender device is pulled past the objects.

In a first embodiment, each of the opposite arms of the deflector member has an elongated substantially cylindrical cross-sectional configuration. In a second modified embodiment, each opposite arm has a pair of transverse angular portions which progressively increase in cross-sectional width and height from the first end to the second end thereof. The transverse angular portions are preferably and respectively horizontally and vertically oriented in a generally orthogonal relationship to one another and thus form a generally right angle. The horizontal segments tend to underlie and support lateral edges of the appliance so as to prevent catching when passing over a platform with cracks therein or spaces between boards on the platform. The vertical segments tend to capture the appliance therebetween thereby preventing lateral movement of the appliance relative to the opposite arms.

The present invention is also directed to a shielded hose assembly which comprises: (a) an elongated hose having an end portion with a connector for securing an appliance thereto; and (b) a hose fender device including (i) a clamp mechanism received on and secured to the end portion of the hose adjacent to the connector provided on the hose, and (ii) a deflector member having a pair of opposite elongated arms, each of the opposite arms having first and second ends, the first ends being secured to the clamp mechanism and extending from opposite sides of the clamp mechanism in a flared divergent relationship to one another to the second ends being free ends such that the opposite arms define a substantially triangular-shaped protected area therebetween extending rearwardly of the connector of the hose for receiving at least a leading portion the appliance in the protected area.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top plan view of a first embodiment of a hose fender device of the present invention.

FIG. 2 is a side elevational view of the first embodiment of the hose fender device of FIG. 1.

FIG. 3 is a front elevational view of the first embodiment showing a clamp mechanism of the hose fender device in a closed position.

FIG. 4 is an enlarged detailed view of the clamp mechanism of the hose fender device shown in FIG. 3.

FIG. 5 is a front elevational view of the first embodiment showing the clamp mechanism of the hose fender device in an open position.

FIG. 6 is an enlarged detailed view of the clamp mechanism of the hose fender device shown in FIG. 5.

FIG. 7 is a top plan view of a second modified embodiment of the hose fender device of the present invention.

FIG. 8 is a side elevational view of the second modified embodiment of the hose fender device of FIG. 7.

FIG. 9 is a front elevational view of the second modified embodiment showing the clamp mechanism of the hose fender device in a closed position.

FIG. 10 is a front elevational view of the second modified embodiment showing the clamp mechanism of the hose fender device in an open position.

FIG. 11 is a transverse sectional view of one of the opposite arms of a deflector member of the second modified embodiment of the hose fender device as seen along line 11—11 of FIG. 7.

DETAILED DESCRIPTION OF THE INVENTION

Referring to the drawings and particularly to FIGS. 1 and 7, there is respectively illustrated first and second embodiments of a hose fender device, generally designated 10. In both embodiments, the hose fender device 10 basically includes a clamp mechanism 12 and a deflector member 14 having a pair of opposite elongated arms 16.

In both embodiments, the clamp mechanism 12 of the device 10 is adapted to be received on and secured to an end portion P of a hose H adjacent to a connector C provided on the hose H for attaching an appliance A thereto. The outer perimeter of the appliance A is represented by the dashed line shown in FIG. 1. The clamp mechanism 12 preferably is adjustable between an open position, as seen in FIGS. 5, 6 and 10, and a selected one of a plurality of closed clamping positions, as seen in FIGS. 3, 4 and 9, which adapts the device 10 for securement to hoses of different diameter sizes. The clamp mechanism 12 can have any suitable configuration allowing its movement between the selected one of the plurality of closed positions and the open position.

More particularly as depicted in the respective embodiments of FIGS. 3–6, 9 and 10, the illustrated example of the clamp mechanism 12 has a base 18 and an adjustable fastening means such as in the form of an elongated strap 20 interconnected at one end portion 20A to the base 18 and detachably attachable at the other end portion 20B to the base 18 so as to be substantially in the form of a loop for receiving the end portion P of the hose H therethrough. The base 18 has opposite bottom and top surfaces 18A, 18B. The bottom surface 18A is generally flat in shape such that the clamp mechanism 12 rests flush on a ground surface. The top surface 18B is curved or arcuate in shape. The base 18 defines a channel 22 therethrough between opposite sides of the base 18 in substantially transverse relationship to a longitudinal axis X of the hose H when the clamp mechanism 12 is attached thereto.

The first end portion 20A of the elongated strap 20 is rigidly attached to the top surface 18B of the base 18 whereas the second end portion 20A is free. The strap 20 extends from the base 18 in an arcuate shaped configuration so as to dispose the second end portion 20B in a position substantially overlying the first end portion 20A. The first and second end portions 20A, 20B of the strap 20 have facing side surfaces defining complementary sets of releasable interengaging first and second elements 24, 26 which permit the conversion of the strap 20 between the closed and open positions about and relative to the hose H. The sets of releasable interengaging elements 24, 26 are in the form of teeth, but may have any other suitable configuration. With different pairs of the interengaging elements 24, 26 being interengageable with one another, the strap 20 is adapted to adjustably and tightly fit about hoses of different diameter sizes. In such manner, the strap 20 is employed to attach and detach the hose fender device 10 to and from the end portion P of the hose H without disturbing the appliance A attached to the connector C on the hose H. The clamp mechanism 12 can be fabricated from any suitable material, such as metal or plastic.

As briefly stated above, the deflector member 14 of the device 10 has a pair of elongated opposite arms 16 attached to and extending from the clamp mechanism 12. Each of the opposite arms 16 have first and second ends 16A, 16B and a substantially snag-free configuration, such as substantially straight shape, adapting the respective arm 16 to come into sliding contact with a nearby object without being snagged by such object. The first ends 16A are secured to the clamp mechanism 12 and extend from opposite sides thereof in a flared divergent relationship to one another to the second ends 16B, which are free ends, such that the opposite arms 16 define therebetween a substantially triangular-shaped protected area 28 extending rearwardly of the connector C of the hose H for receiving at least a leading end portion L of the appliance A in the protected area 28.

More particularly, the deflector member 14 is resilient and yet pliable and can be fabricated from any suitable material, such as metal, plastic or metal that is substantially coated with plastic. The opposite arms 16 defined by the deflector member 14 may be attached to the base 18 of the clamp mechanism 12 in any suitable manner. In one illustrated example, the deflector member 14 defines a middle portion 30 interconnecting the opposite arms 16 such that the opposite arms 16 extend from opposite ends of the middle portion 30. The middle portion 30 is disposed through the channel 22 defined by the base 18 of the clamp mechanism 12 in a tight-fitting relationship with the base 18. The flared relationship of the opposite arms 16 ensures that they will be first to come in sliding contact with a nearby object and not be snagged by the object and thus protect the appliance A so that it will clear and not be snagged by the object. In the first embodiment of FIGS. 1–3 and 5, each of the opposite arms 16 have an elongated substantially cylindrical configuration. The second ends 16B of the arms 16 are spaced about ten inches, though may be spaced any other suitable distance, from one another. Also, the leading and trailing ends of the device 10 are spaced about ten inches, though may be spaced any other suitable distance, from one another.

Referring to FIGS. 7 to 11, there is illustrated a second, modified embodiment of the hose fender device 10 which incorporates the same parts as those of the hose fender device 10 described in the first embodiment above. These same parts are identified with the same reference numbers in the drawings. The second embodiment of the hose fender device 10 also adds several improved features thereto.

The first improved feature concerns a modification of the configuration of each of the opposite arms 16 for preventing legs or runners of the appliance A, such as a water sprinkler, attached to the connector C of the hose H from falling through cracks of a platform or the like when the appliance A is pulled over the platform. Each arm 16 has a pair of transverse angular portions 32, 34 which are angularly spaced apart from one another and extend outwardly from and in a substantially transverse relationship to a longitudinal axis Y of arm. The angular portions 32, 34 also progressively increase in cross-sectional width "w" and height "h" from the first end 16A to the second end 16B thereof. The transverse angular portions 32, 34 are preferably and respectively horizontally and vertically oriented and thus form a substantially right angle, as seen in FIG. 11. The horizontal segments 32 tend to underlie and support lateral edges of the appliance A when passing over a platform with cracks therein or spaces between boards on the platform. The vertical segments 34 tend to capture the appliance therebetween and thereby prevent lateral movement of the appliance relative to the opposite arms 16.

The second improved feature is directed to a leading end 36 of the clamp mechanism 12 forming a tapered annular-shaped edge which provides a flared transitional surface from the hose H to the arms 16 defined by the deflector member 14 when the clamp mechanism 12 is in the closed position. Having a substantially conical shape, the leading end 36 is less likely to catch on nearby objects when the hose fender assembly 10 is pulled past the objects.

The third improved feature relates to a series of grooves 38 defined on each of the opposite arms 16 in substantially transverse relationship to a longitudinal axis Y of each arm 16. The grooves 38 face forward such that corresponding opposite ones catch adjacent opposite edges E of the leading portion L of the appliance A so as to stabilize and hold the appliance A between the opposite arms 16.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A hose fender device, comprising:
   (a) a clamp mechanism adapted to be received on and secured to an end portion of a hose forwardly of a connector provided on the hose for attaching an appliance thereto; and
   (b) a deflector member having a pair of opposite elongated arms, each of said opposite arms having first and second ends, said arms having substantially snag-free configurations in which said first ends thereof are secured to said clamp mechanism and extend from opposite sides of said clamp mechanism in a flared divergent relationship to one another to said second ends being free ends such that said opposite arms are adapted to come into sliding contact with a nearby object without being snagged by such object and thereby define a substantially triangular-shaped snag-free protected area for the appliance therebetween extending rearwardly of the connector of the hose for receiving at least a leading portion of the appliance in said protected area.

2. The device of claim 1 wherein said clamp mechanism includes a base and a strap interconnected at one end to said base and detachably attachable at an opposite end to said base so as to be substantially in the form of a loop for receiving the end portion of the hose therethrough and for attaching said clamp mechanism on the hose.

3. The device of claim 2 wherein:
   said base of said clamp mechanism defines a channel therethrough in substantially transverse relationship to a longitudinal axis of the hose when said clamp mechanism is attached to the hose; and
   said deflector member further defines a middle portion interconnecting said first ends of said opposite arms such that said opposite arms extend from opposite ends of said middle portion, said middle portion being disposed in said channel defined by said base of said clamp mechanism.

4. The device of claim 1 wherein each of said opposite arms defined by said deflector member have an elongated substantially cylindrical configuration.

5. A hose fender device, comprising:
   (a) a clamp mechanism adapted to be received on and secured to an end portion of a hose forwardly of a connector provided on the hose for attaching an appliance thereto; and
   (b) a deflector member having a pair of opposite elongated arms, each of said opposite arms having first and second ends, said first ends being secured to said clamp mechanism and extending from opposite sides of said clamp mechanism in a flared divergent relationship to one another to said second ends being free ends such that said opposite arms define a substantially triangular-shaped protected area therebetween extending rearwardly of the connector of the hose for receiving at least a leading portion of the appliance in said protected area;
   (c) each of said opposite arms defined by said deflector member having a longitudinal axis and a pair of transverse angular portions angularly spaced apart from one another and extending outwardly from and in a substantially transverse relationship to said longitudinal axis of said arm.

6. The device of claim 5 wherein said transverse angular portions of each of said opposite arms progressively increase in cross-sectional width and height from said first end to said second end of said each of said opposite arms.

7. A hose fender device, comprising:
   (a) a clamp mechanism adapted to be received on and secured to an end portion of a hose forwardly of a connector provided on the hose for attaching an appliance thereto; and
   (b) a deflector member having a pair of opposite elongated arms, each of said opposite arms having first and second ends, said first ends being secured to said clamp mechanism and extending from opposite sides of said clamp mechanism in a flared divergent relationship to one another to said second ends being free ends such that said opposite arms define a substantially triangular-shaped protected area therebetween extending rearwardly of the connector of the hose for receiving at least a leading portion the appliance in said protected area;
   (c) each of said opposite arms having a series of grooves defined thereon in substantially transverse relationship to a longitudinal axis of said each arm such that opposite edges of the leading portion of the appliance can engage with corresponding opposing ones of said grooves so as to stabilize and hold the appliance between said opposite arms.

8. A hose fender device, comprising:
   (a) a clamp mechanism adapted to be received on and secured to an end portion of a hose forwardly of a connector provided on the hose for attaching an appliance thereto; and
   (b) a deflector member having a pair of opposite elongated arms, each of said opposite arms having first and second ends, said first ends being secured to said clamp mechanism and extending from opposite sides of said clamp mechanism in a flared divergent relationship to one another to said second ends being free ends such that said opposite arms define a substantially triangular-shaped protected area therebetween extending rearwardly of the connector of the hose for receiving at least a leading portion of the appliance in said protected area;
   (c) said clamp mechanism havinq a leading end forming a tapered annular-shaped edge which provides a flared transitional surface from the hose to said opposite arms defined by said deflector member.

9. A hose fender device, comprising:

(a) an annular clamp mechanism including a base having a bottom surface substantially flat in shape such that said clamp mechanism rests flush on a ground surface, said clamp mechanism also including adjustable fastening means mounted above said base and adapted to be adjustably received over and secured about an end portion of a hose forwardly of a connector provided on the hose for attaching an appliance thereto; and (b) a deflector member including a pair of opposite arms each having first and second ends, said first ends being attached to said base of said clamp mechanism at opposite sides thereof, said opposite arms extending from said opposite sides of said clamp mechanism in a flared divergent relationship to one another to said second ends being free ends such that said opposite arms together define a substantially triangular-shaped protected area therebetween extending rearwardly of the connector of the hose for receiving at least a leading portion of the appliance in said protected area.

10. The device of claim 9 wherein:

said base of said clamp mechanism defines a channel therethrough in substantially transverse relationship to a longitudinal axis of the hose when said clamp mechanism is attached to the hose; and said deflector member further defines a middle portion interconnecting said first ends of said opposite arms such that said opposite arms extend from opposite ends of said middle portion, said middle portion being disposed in said channel defined by said base of said clamp mechanism.

11. The device of claim 9 wherein:

said adjustable fastening means is a strap interconnected at one end to said base and detachably attachable at the other end to said base so as to be substantially in the form of a loop for surrounding and securing said clamp mechanism to the hose.

12. The device of claim 11 wherein said strap of said clamp mechanism has opposite first and second end portions with facing side surfaces provided with complementary sets of releasable interengaging elements permitting conversion of said strap between closed and open positions about and relative to the hose.

13. The device of claim 9 wherein each of said opposite arms defined by said deflector member have an elongated substantially cylindrical configuration.

14. The device of claim 9 wherein each of said opposite arms defined by said deflector member have a pair of transverse angular portions.

15. The device of claim 14 wherein said transverse angular portions of each of said opposite arms progressively increase in cross-sectional width and height from said first end to said second end of said each of said opposite arms.

16. The device of claim 15 wherein said pair of transverse angular portions of each of said opposite arms defined by said deflector member are respectively substantially horizontally and vertically oriented and thus form a substantially right angle.

17. The device of claim 9 wherein each of said opposite arms has a series of grooves defined thereon in substantially transverse relationship to a longitudinal axis of said each arm such that opposite edges of the leading portion of the appliance can engage with corresponding opposing ones of said grooves so as to stabilize and hold the appliance between said opposite arms.

18. The device of claim 9 wherein said clamp mechanism has a leading end forming a tapered annular-shaped edge which provides a flared transitional surface from the hose to said opposite arms defined by said deflector member.

19. A shielded hose assembly, comprising:

(a) an elongated hose having an end portion with a connector for securing an appliance thereto; and (b) a hose fender device including (i) a clamp mechanism received on and secured to said end portion of said hose forwardly of said connector provided on said hose, and (ii) a deflector member having a pair of opposite elongated arms, each of said opposite arms having first and second ends, said arms having substantially snag-free configurations in which said first ends thereof are secured to said clamp mechanism and extend from opposite sides of said clamp mechanism in a flared divergent relationship to one another to said second ends being free ends such that said opposite arms are adapted to come into sliding contact with a nearly object without being snagged by such object and thereby define a substantially triangular-shaped snag-free protected area for the appliance therebetween extending rearwardly of said connector of said hose for receiving at least a leading portion of the appliance in said protected area.

20. The assembly of claim 19 wherein said clamp mechanism has a leading end forming a tapered annular-shaped edge providing a flared transitional surface from said hose to said opposite arms of said device.

* * * * *